United States Patent [19]
Quinlisk et al.

[11] Patent Number: 4,653,574
[45] Date of Patent: Mar. 31, 1987

[54] AIR TO AIR HEAT EXCHANGER

[75] Inventors: Warren W. Quinlisk, La Crosse; James A. Fernholz, Galesville, both of Wis.

[73] Assignee: L. B. White Company, Inc., Onalaska, Wis.

[21] Appl. No.: 774,376

[22] Filed: Sep. 9, 1985

Related U.S. Application Data

[63] Continuation of Ser. No. 520,206, Aug. 4, 1983, abandoned.

[51] Int. Cl.$^4$ ............................................. F24H 3/02
[52] U.S. Cl. ........................................... 165/54; 165/17
[58] Field of Search .................. 165/17, 32, 54, 165, 165/166, DIG. 2; 98/38 B, 38 D; 62/140

[56] References Cited

U.S. PATENT DOCUMENTS

| | | | |
|---|---|---|---|
| 1,825,498 | 9/1931 | Wogan | 165/157 |
| 1,833,166 | 11/1931 | Lucke | 165/81 |
| 1,961,792 | 6/1934 | Schack | 165/165 |
| 2,019,351 | 10/1935 | Lathrop | 165/165 |
| 2,231,826 | 2/1941 | Foss | 165/32 |
| 2,928,255 | 3/1960 | Harnish | 62/140 |
| 3,273,635 | 9/1966 | Jobes | 165/17 |
| 3,508,606 | 4/1970 | Blanchard et al. | 165/165 |
| 3,525,391 | 8/1970 | Day | 165/166 |
| 3,847,211 | 11/1974 | Fischel et al. | 165/166 |
| 3,986,549 | 10/1976 | Huggins et al. | 165/166 |
| 4,140,266 | 2/1979 | Wagner | 165/32 |
| 4,184,538 | 1/1980 | Rauenhorst | 165/66 |
| 4,244,422 | 1/1981 | Hallgren | 165/1 |
| 4,334,577 | 1/1982 | George | 165/54 |
| 4,436,145 | 3/1984 | Manfredo et al. | 165/166 |
| 4,461,344 | 7/1984 | Allen et al. | 165/165 |

FOREIGN PATENT DOCUMENTS 1154681  4/1958  France ................................. 165/32

Primary Examiner—Robert E. Garrett
Assistant Examiner—John Kwon
Attorney, Agent, or Firm—Merchant, Gould, Smith, Edell, Welter & Schmidt

[57] ABSTRACT

A heat exchanger (10) for transferring heat between intake air and exhaust air is disclosed. The heat exchanger (10) includes a plurality of ducts (11) having open first and second ends (11c and 11d). The ducts (11) are connected in a vertical space relationship to one another defining therewith two sets of channels. A first set of channels (11a) being inside the ducts (11) and a second set of channels (11b) being between the ducts (11). Intake air passes through the first set of channels (11a) and exhaust air passes through the second set of channels (11b). The air flow in the second set of channels (11b) is confined. The heat exchanger has a releasably attached bottom (24), whereby when the bottom (24) is released, there is ready access to clean said second set of channels (11b) between the ducts (11). Also, the intake air and exhaust air enter and an exit through their respective sets of channels without mixing. The heat exchanger (10) has an inlet (18a) and outlet (19a) for fresh air in the first set of channels (11a) and an inlet (30a) and outlet (34a) for exhaust air in the second set of channels (11d). Also, in a preferred embodiment, a pressure differential switch (42) is provided for sensing the difference between room air pressure and air pressure proximate the second set of channels (11b) adjacent the outlet (34a) for the exhaust air.

10 Claims, 7 Drawing Figures

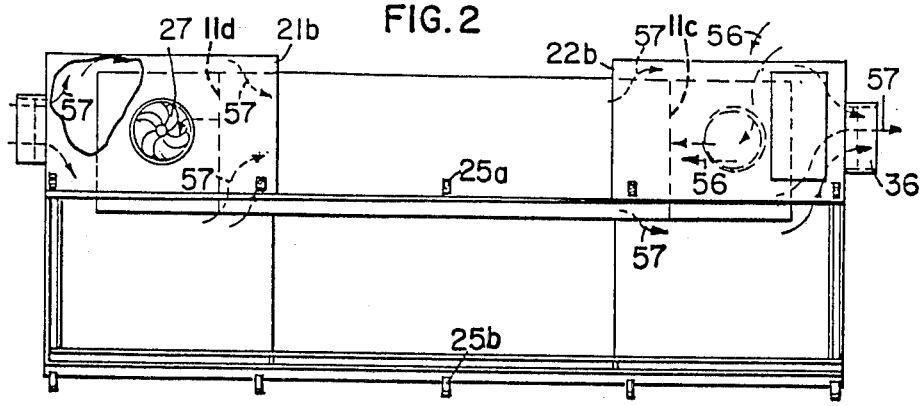
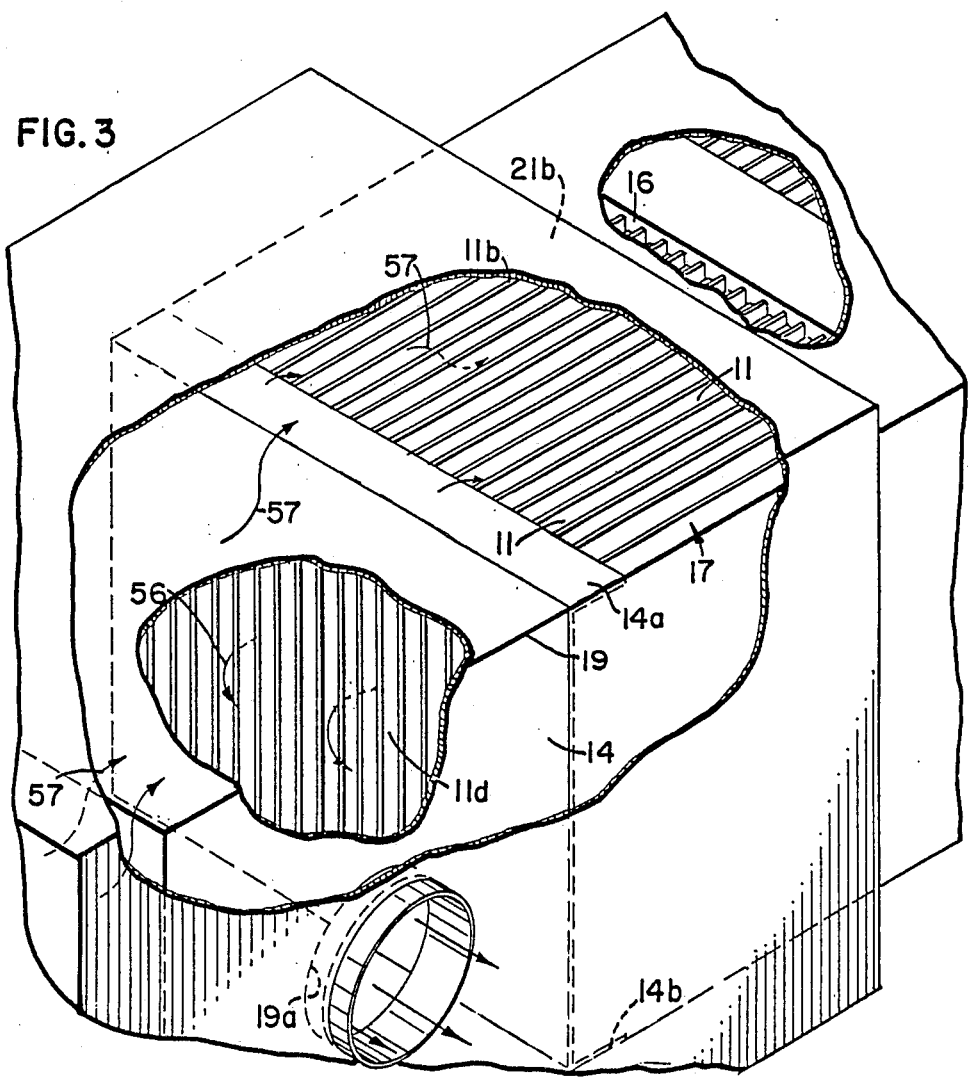

AIR TO AIR HEAT EXCHANGER

This is a continuation of application Ser. No. 520,206, filed Aug. 4, 1983, now abandoned.

BACKGROUND OF THE INVENTION

1. Field of the Invention

This invention relates generally to air-to-air heat exchangers, and more particularly to air-to-air heat exchangers for use in animal confinement buildings.

2. Description of the Prior Art

Due to the drastic increase of energy costs over the past several years, there has been a renewed interest in air-to-air heat exchangers. In general, the air-to-air heat exchangers are designed to use the heat in the air that is exhausted from a building to warm or preheat fresh air as it is brought into the building.

A heat exchanger that is used in an animal confinement building is subjected to severe operating conditions. That is, the exhaust air in an animal confinement building contains a great deal of humidity, dirt and dust. It is important to be able to easily clean the warm (exhaust) air stream of the heat exchanger. The prior art units to date have not adequately addressed or solved this cleaning problem. Through a number of novel design configurations, the present application provides for a heat exchanger that allows easy cleaning.

In cold weather, the moisture condensing out of the air may freeze on the plates as it exits through the heat exchanger. As the ice builds up on the plates, the exhaust air flow becomes restricted. A number of prior art heat exchangers use a timer, wherein at preset intervals, the fan blowing in the intake air is shut off. This provides for only the exhausting of warm air, which melts any ice build-up. The major disadvantage of such an arrangement is that the heat exchanger is defrosted whether or not there is an ice build-up. The present invention provides for a demand defrosting, which assures that the unit will defrost only when necessary.

The present invention effectively addresses the problems of the prior art heat exchangers and provides for a highly efficient, and easily cleanable unit.

SUMMARY OF THE INVENTION

A heat exchanger for transferring heat between intake air and exhaust air is disclosed. The heat exchanger includes a plurality of ducts having open first and second ends. The ducts are connected in a vertical spaced relationship to one another, defining therewith two sets of channels. The first set of channels being inside the ducts and the second set of channels being between the ducts. Intake air passes through the first set of channels and exhaust air passes through the second set of channels. Means for confining air flow in the second set of channels is provided. The confinement means has a releasably attached bottom, whereby when the bottom is released, there is ready access to clean between the ducts. Means for allowing the intake air and exhaust air to enter and exit from their respective sets of channels without mixing is also provided. The enter and exit means provides an inlet and outlet for fresh air in the first set of channels and an inlet and outlet for exhaust air in the second set of channels.

In a preferred embodiment, the heat exchanger further includes fans for moving the exhaust air and intake air through the first and second set of channels. Preferably, the heat exchanger also includes a pressure differential switch for sensing the difference between room air pressure and air pressure proximate the second set of channels adjacent the outlet for the exhaust air. A means for controlling the intake fan is provided. The control means is activated by the pressure differential switch, whereby when the pressure difference reaches a predetermined value, the control means shuts off the intake fan.

BRIEF DESCRIPTION OF THE DRAWINGS

FIG. 2 is a front elevational view of the heat exchanger of FIG. 1, showing the case bottom in the down position;

FIG. 3 is an enlarged perspective view of the heat exchanger of FIG. 1, showing the fresh air outlet end of the heat exchanger;

DETAILED DESCRIPTION OF THE PREFERRED EMBODIMENT

Figure 1:
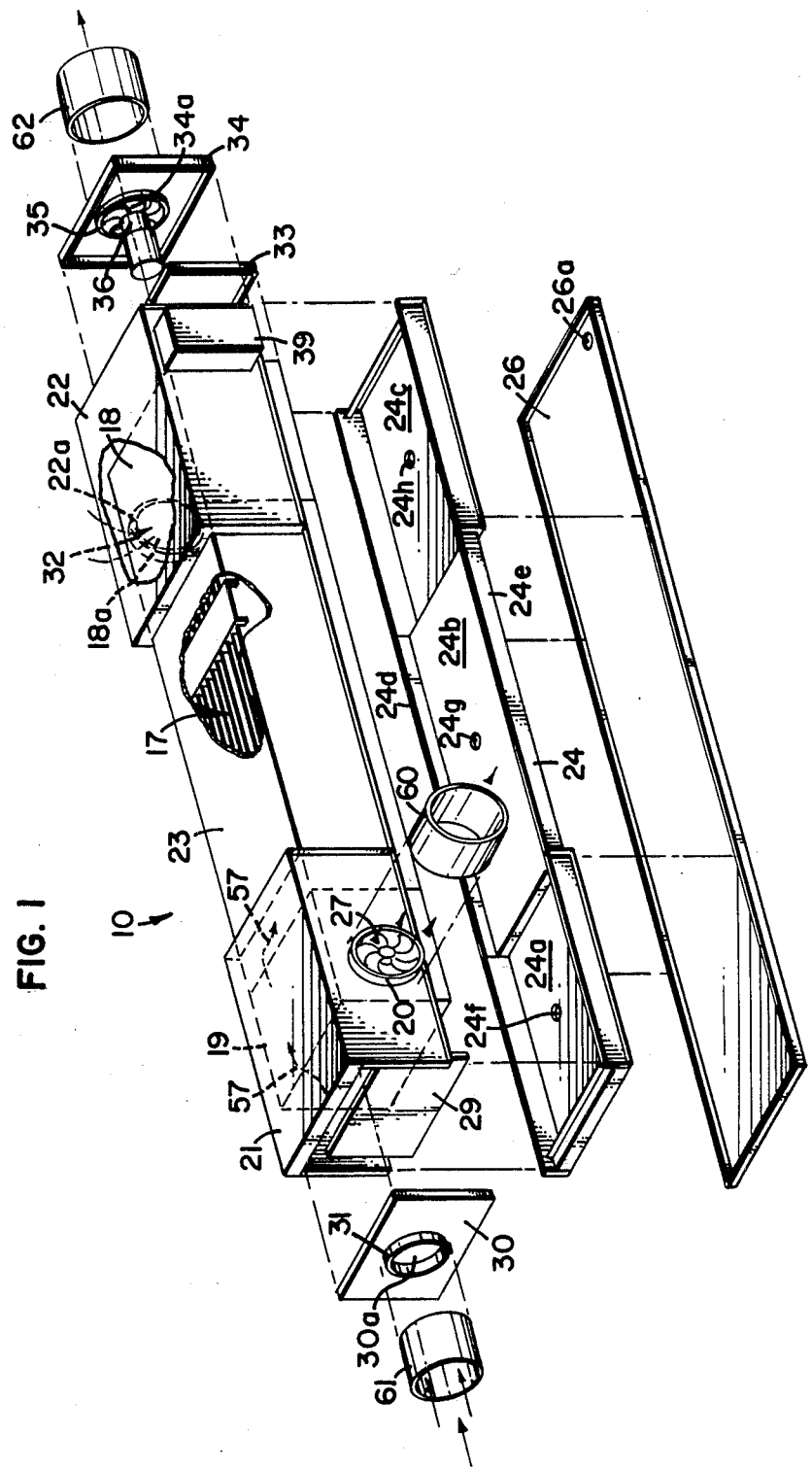
FIG. 1 is an exploded perspective view of the heat exchanger incoporating the present invention.

Referring to the drawings, wherein like numerals represent like parts throughout the several views, there is generally disclosed at 10, an air-to-air heat exchanger. The heat exchanger 10 includes a plurality of ducts 11. The ducts 11 are connected in a vertical spaced relationship to one another and define therewith a first set of channels 11a and a second set of channels 11b. A duct 11 includes a first sheet 12 cooperatively connected to a second sheet 13. The first sheet 12 has an outer edge 12a and a flange 12b. The second sheet 13 has a downwardly depending side 13a and a flange 13b. The duct is assembled by inserting the flange 13b of the second sheet 13 between the outer edge 12a and the upper flange 12b of sheet 12. The upper flange 12b is then crimped on top of the flange 13b to form the duct 11. The ducts 11 have an open first end 11c and an open second end 11d. The first of channels 11a are inside the ducts 11 and the second set of channels 11b are between adjacent ducts. Fresh air, or intake air, passes through the first set of channels 11a and exhaust air passes through the second set of channels 11b.

Figure 4:
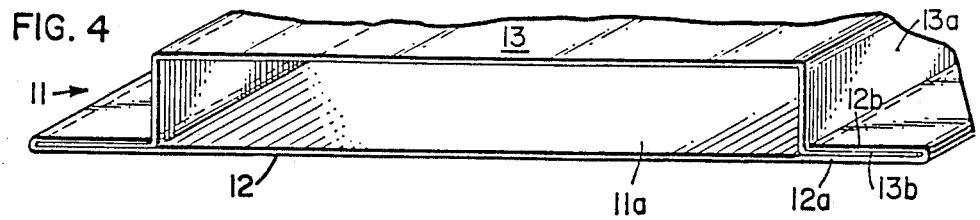
FIG. 4 is a perspective view of the ducts used in the heat exchanger of FIG. 1.

As shown in FIG. 3, the second ends 11b of the ducts 11 are held in a spaced relationship by an end spacer plate 14. The end spacer plate 14 has a top flange 14a and a bottom flange 14b. A plurality of openings, having profiles slightly larger than the ends of the ducts 11, as shown in FIG. 4, are provided throughout the main body of the end spacer plate 14 at the desired intervals. The ends 11d of the ducts 11 are inserted into the openings in the end spacer plate 14. A liquid sealant 15 is applied to seal the spaces between the outside edges of the duct 11 and the end spacer plate 14. As will be discussed more fully hereafter, this prevents cross contamination of the two air streams. A similar end spacer plate is attached to and sealed to the first ends 11c of the ducts 11. A top plate spacer 16 is cooperatively connected to the ducts 11. Typically, the plate spacer 16 is simply connected by press fitting the connector onto the ducts. The spacer 16 maintains the proper spacing along the lengths of the ducts 11. In a preferred embodiment, two top plate spacers are used to maintain the proper spacing. However, it is understood that other appropriate numbers of spacers may be used. In addition, equivalent bottom plate spacers (not shown) are used on the bottom of the ducts 11. These bottom spacers also assist in maintaining the proper spacing between the ducts 11 and prevent the ducts from bowing in or out along the length of the ducts 11. Throughout the rest of the description, the assembly comprising the ducts 11, end spacer plates 14, sealant 15, top plate spacer 16 and bottom plate spacer will be referred to as a core assembly 17.

A first element head assembly 18 is cooperatively connected to the first ends 11c of ducts 11 and a second element head assembly 19 is cooperatively connected to the second ends 11d of the ducts 11. The element head assembly 19 is in the general shape of rectangular prism having one open side. The size of the rectangular prism corresponds to the size of the end spacer plate, such that when the open side of the element head assembly 19 is abutted against and connected to the end spacer plate 14 adjacent te second end 11d, the outer surfaces will be approximately continuous. An opening 19a is provided in one side of the element head assembly 19. The element head assembly 19 defines an open inner cavity have two openings. The first is the previously described open end abutting the end plate 14 and the second is the opening 19a. Therefore, as will be more fully described hereafter, fresh air may exit the first set of channels 11a at the second 11d of ducts 11 and enter into the inner cavity of the element head assembly 19. The fresh air then exits through the opening/outlet 19a. The element head assembly 19 has a removable end section 29. The end section 29 may be releasably secured to the case head assembly by any suitable manner, such as screws. An extension shroud 20 is cooperatively connected between the outlet 19a and a case head assembly 21. The case head assembly 21 encircles the element head assembly 19 and a portion of the ducts 11.

Similarly, the element head assembly 18 is in the general shape of rectangular prism having one open side. The size of the rectangular prism corresponds to the size of the end spacer plate, such that when the open side of the element head assembly 18 is abutted against and connected to the end spacer plate 14 adjacent the first end 11c, the outer surfaces will be approximately continuous. An opening 18a is provided in one side of the element head assembly 18. The element head assembly 18 defines an open inner cavity have two openings. The first is the previously described open end abutting the end plate and the second is the opening 18a. Therefore, as will be more fully described hereafter, fresh air may enter the first set of channels 11a at the first 11c of ducts 11 after entering the opening 18a. The fresh air then travels through ducts 11. The element head assembly 18 has a removable end section 33. The end section 33 may be releasably secured to the case head assembly by any suitable manner, such as screws. An extension shroud 32 is cooperatively connected between the opening 18a and a case head assembly 22. The case head assembly 22 encircles the element head assembly 18 and a portion of the ducts 11.

A core assembly enclosure 23 encircles that portion of the ducts 11 that are not enclosed by the case head assemblies 21 and 22. The core assembly enclosure 23 is cooperatively connected to the case head assemblies 21 and 22 by any appropriate means, well known in the art. A bottom case assembly 24 is cooperatively connected to the bottom of the case head assembly 21, case head assembly 22 and core assembly enclosure 23. The bottom case assembly 24 has a first section 24a, second section 24b and third section 24c. When the bottom case assembly 24 is in a closed position, the first section 24a completes the case head assembly 21, the second section 24b completes the core assembly enclosure 23 and the third section 24c completes the case head assembly 22. The bottom case assembly 24 is releasably attached to the underneath side of the case head assemblies 21 and 22 and the core assembly enclosure 23. FIG. 2 shows the bottom case assembly 24 in an open position. In a preferred embodiment the bottom case assembly 24 is secured along its front edge 24e and its back edge 24d by plurality of releasable latches 25. As shown in FIG. 2, there are five latches along the front edge 24e, with a corresponding number of latches along the back edge 24d. The latches 25 comprise a first section 25a that are secured to the case head assemblies or core assembly enclosure. A second portion 25b is secured to the bottom case assembly pan 24. The second portion 25b simply hooks over the first portion 25a to secure the bottom case assembly 24 in its up or closed position. To pivot or swing the bottom case assembly 24 down to the open or cleaning position, the second portion 25b are released from the first portion 25a and the bottom case assembly 24 will pivot downwards. To completely remove the bottom case assembly 24, the corresponding latches on the back side 24d of the bottom case assembly 24 are removed.

A drip pan 26 is cooperatively connected to the bottom of the bottom case assembly 24. Holes 24f, 24h and 24g provide for drainage of any condensate to the drip pan 26. Hole 26a provides for drainage from the drip pan 26. Appropriate connection means may be secured to the hole 26a to carry away the condensate.

Mounted in the extension shroud 20 is a fan 27. The case head assembly 21 has an exhaust air intake opening 30a, formed in an end piece 30. An end piece 30 is cooperatively connected to the case head assembly 21. An extension shroud 31 is then cooperatively connected through the opening 30a.

The element head assembly 18 has an opening 18a for a fresh air inlet. The case head assembly 22 has an opening 22a that is aligned with the opening 18a. An extension shroud 32 is cooperatively connected and aligned through the openings 18a and 22a so that fresh air may enter the element head assembly 18 without entering the case head assembly 22.

The element head assembly 18 has an end section 33 similar to end section 29. The end section 33 is cooperatively connected to the element head assembly 18. An end piece 34 having an opening 34a is cooperatively connected to the case head assembly 22. An extension shroud 35 is cooperatively connected through the openings 34a and a fan 36 is mounted in the opening 34a. The opening 34a is the outlet for the exhaust air.

Figure 7:
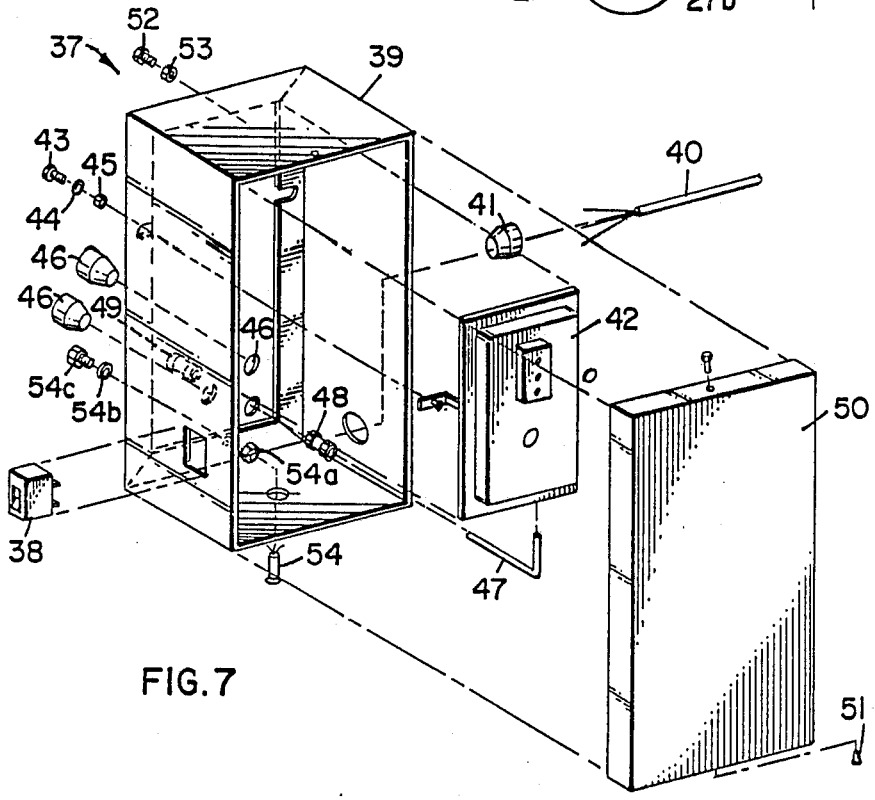
FIG. 7 is an exploded perspective view of the control box assembly as shown in FIG. 1.
Figure 6:
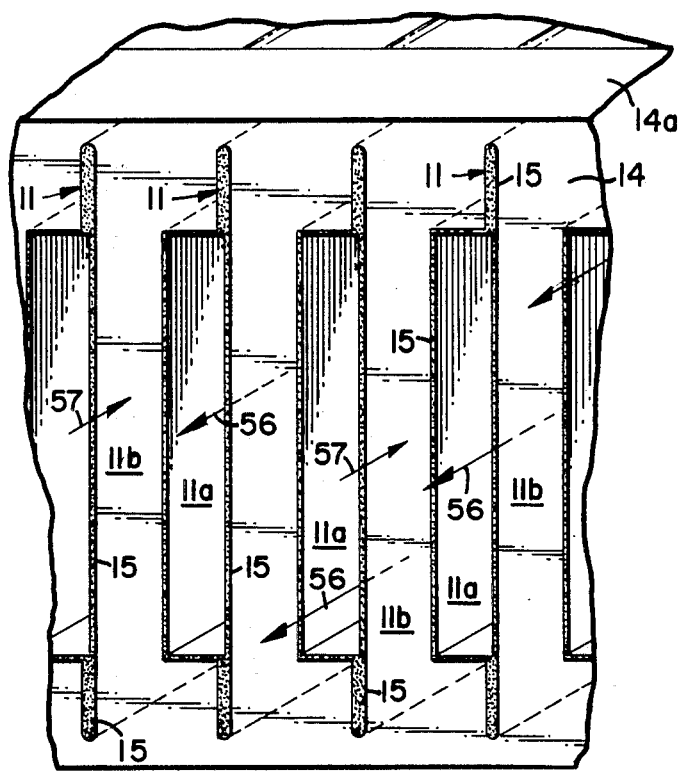
FIG. 6 is an enlarged perspective view showing a plurality of ducts, as shown in FIG. 4, in their spaced relationship.

A control box 37 is mounted to the case head assembly 22. The control box assembly, designated generally as 37, is shown in FIG. 7. An on/off switch 38 is mounted in a control box 39. Power is supplied via a power cord 40 that is mounted through the control box 39 with a strain relief 41. The details of the electrical connections will be more fully described hereafter, with reference to FIG. 5. A pressure differential switch 42 is mounted in the control box 39 by means of bolt 43, washer 44 and nut 45. The pressure differential switch may be any suitable switch, such as model number AFS 271 from Cleveland Controls of Cleveland, Ohio. Strain reliefs 46 are mounted in openings in the control box 39. The connected wires from the fan 27 and 26 are positioned in the strain reliefs. Tubing 47 is cooperatively connected to and in fluid communication with the pressure differential switch 42. The tubing is mounted through an opening in the control box 39 with a nylon fitting 48 with a nut. A nylon fitting bushing 49 is used on the outside of the control box 39 to further secure the tubing 47. The tubing 47 extends into the cavity between the element head assembly 18 and case head assembly 22. The fitting 48 and nylon fitting bushing 49 isolate the tubing 47 such that the air pressure in the cavity between the element head assembly 18 and case head assembly 22 is measured. A cover 50 is secured to the control box 39 by means of screws 51. Screw 52 and washer 53 are used to mount air flow switch 42 in control box with screw 43, washer 44 and nut 45. A light 54 is force fit through an opening in the bottom of the control box 34. Nut 54a, washer 54b and bolt 54c fasten control box to case.

Figure 5:
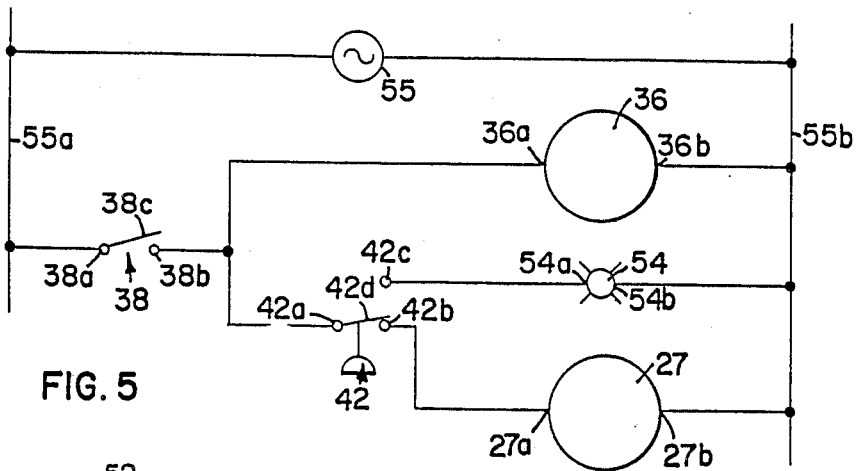
FIG. 5 is a schematic drawing of the controls for the heat exchanger of FIG. 1.

A schematic of the present invention is shown in FIG. 5. 110 volt AC power is supplied to the on/off switch 38. The on/off switch is a two-position two-terminal switch. The hot conductor 55a of the 110 volt power supply 55 is connected to the first terminal 38a of switch 38. The inside fan 36 and outside fan 27 are connected in parallel. A first terminal 36a of the fan 36 is connected to the second terminal 38b of the switch 38. A second terminal 36b of the inside fan is connected to the ground conductor 55b of the 110 volt supply. The pressure differential switch 42 is serially interposed between the first terminal 27a of the outside fan and the second terminal 38b of the switch 38. The pressure differential switch 42 is a two-position switch having three terminals, a first terminal 42a, second terminal 42b and third terminal 42c. The first terminal 42a is connected to the second terminal 38b and the second terminal 42b is connected to the first terminal 27a. The third terminal 42c is connected to a first terminal 54a of the light 54. The second terminal 54b of the light 54 is connected to the ground conductor 55b. When the actuator 38c of the switch 38 is in the up or open position, as shown in FIG. 5, the fans 36 and 27 are not operational. When the switch 38 is in the on position, the actuator 38c contacts the second terminal 38b. The inside fan 36 is then activated. If the pressure differential switch 42 is in its first position, with the actuator 42d contacting the second terminal 42b as shown in FIG. 5, the outside fan 27 is also energized. When the pressure differential switch 42 is in its second position, the actuator arm 42d contacts the third terminal 42c. This causes the light 54 to be energized and to deactivate the outside fan 27.

In a preferred embodiment, the heat exchanger 10 incorporates 20 aluminum ducts 11 to transfer heat from the exhaust to intake air streams. The two aluminum sheets 12 and 13 have a spacing of 5/16 of an inch apart. The spacing between the adjacent ducts 11 is also 5/16 of an inch. The ducts 11 are 48 inches in length and 11 inches in width. The width includes the flange area 13b. The width of the first set of channels 11a is 10 inches.

The heat exchanger 10 was specifically designed for use in animal confinement buildings, however it is of course possible to use the heat exchanger 10 in other buildings. When used in an animal confinement building, the heat exchanger 10 should be located as close to the ceiling of the building as possible in order to maximize head room. The exhaust outlet 43a should be located on the side of the building opposite the prevailing winds. The exhaust air inlet 30a should be located in an area that minimizes the amount the feed dust entering the heat exchanger 10. The outside air inlet 18a may draw air from outside the building or from the attic. Since the air from an attic will be significantly warmer than the outside air, drawing air from the attic will improve energy savings. Any duct work that will be added should slope down and away from the heat exchanger to prevent condensate in the duct work from running into the heat exchanger 10. If fresh air is not taken from the attic, then the fresh air opening in the wall of the confinement building should be at least 8 feet from the exhaust air outlet opening 34a to prevent recycling of moist, contaminated exhaust air back into the building.

While the heat exchanger 10 may be installed by any appropriate method, one method is to secure the top of the heat exchanger 10 to the ceiling of the confinement building by means of a plurality of hooks and chains.

It is understood, that it is well-known in the art how to construct suitable air tight enclosures such as the element head assemblies 18 and 19, case head assemblies 21 and 22 and core assembly enclosures 23.

In operation, fresh air enters the heat exchanger 10 through the opening 22a, passes inside the extension shroud 32 and exits from the opening 18a into the inner cavity of the element head assembly 18. The flow of the intake or fresh air is designated in the drawings by arrows generally designated as 56. The flow of the exhaust air is shown in the drawings by arrows generally designated as 57. The air entering the element head assembly 18 then reaches the end spacer plate 14. The sealant 15 has sealed the area between the ducts 11, therefore, the fresh air enters the first set of channels 11a and travels from the first end 11c to the second end 11d of the ducts 11. Upon exiting the second end 11d, the fresh air enters the interior cavity of the element head assembly 19. Since the element head assembly 19 has only one opening, the fresh air is drawn out of the element head assembly 19 by the intake fan 27. This fresh air may then be distributed throughout the animal confinement building by appropriate duct work (not shown) cooperatively connected to the extension shroud 20 by means of duct extension 60 that is cooperatively connected to the extension shroud 20. Similarily, the fresh air enters the extension shroud 32 through suitable duct work and duct extension (not shown). The fan 27 pulls the fresh air through the plates, and does not push the air through them. This pulling of the air through the plates minimizes any dead spots along the ducts 11 and contributes to full utilization of the heat transfer surface available. A profile of the velocity of air entering a fan is relatively constant, wherein a profile of the velocity of air leaving a fan is higher at the edges, and less towards the middle. Therefore, by pulling the air through the first set of channels 11a, a more even air flow results.

The exhaust air, shown by the arrows 57, is drawn through the heat exchanger 10 by the exhaust fan 36. The exhaust air enters the extension shroud 31 and passes through the opening 30a. Suitable duct work (not shown) is cooperatively connected to the extension shroud 31 by means of duct extension 61 that is cooperatively connected to the extension shroud 31. The air flow will then hit the end section 29 of the element head assembly 19. Since the element head assembly 19 has no openings into the inside of the case head assembly 21, the exhaust air cannot enter the element head assembly 19. The exhaust air therefore travels around the element head assembly 19 toward the duct 11. The exhaust air then enters the second set of channels 11b between the ducts 11, as shown in FIG. 3. Since the ducts 11 have a substantially air tight exterior surface, the exhaust air is not able to enter the first set of channels 11a. The exhaust air then continues along the second set of channels 11b from the second end 11d to the first end 11c. The exhaust air first enters the second set of channels 11b after the end spacer plate 14 but before the sidewall 21b as the exhaust air travels to the first end 11c, the exhaust air will exit after the sidewall 22b of case head assembly 22 and proceed around the element head assembly 18. Similar to the element head assembly 19, the exhaust air will be unable to enter the interior or the element head assembly 18. The exhaust fan 36 then continues to draw the air out through the opening 34a and through the extension shroud 35. Suitable duct work (not shown) may be attached to the extension shroud 35 by means of duct extension 62 that is cooperatively connected to the extension shroud 35 to exhaust the air in an appropriate place.

The heat exchanger 10 has two separate air streams, the exhaust air stream (inside air being exhausted) which travels through the second set of channels 11b and the fresh air stream (outside air being supplied) which travels through the first set of channels 11a. The exhaust air stream will usually require cleaning once every three months for an average animal confinement building installation. It is of course recognized that installation with high dust levels or automatic feeders require more frequent heat exhanger cleaning. The fresh air stream is typically checked only once every year for foreign material and cleaned, if necessary. Since the exhaust air stream requires frequent cleaning, the present heat exchanger 10 has been specifically designed to provide for ease of cleaning of the second set of channels 11b. To clean the second set of channels 11b, the drip pan 26 may be removed from the bottom case assembly 24. Providing releasable brackets would be one example of a method to easily secure the drip pan 26 to the bottom case assembly 24 and still allow for ease of removal. The bottom case assembly 24 is then removed. To remove the bottom case assembly 24, eight latches 25 are first unhooked, leaving the two center latches 25, one on each side, until the last. The two center latches 25 are then unhooked and the bottom case assembly 24 may then be simply lowered and removed. If desired, the bottom case assembly 24 can hang on one side of the heat exchanger 10 if complete removal is undesired. The bottom case assembly can be released with the drip pan 26 attached. This is shown in FIG. 2. To accomplish this, all 10 latches are loosened, but only the five latches on one side are unhooked. This will permit access to the bottom of the second set of channels 11b without the complete removal of the bottom case assembly 24. The ducts 11b may then simply be cleaned by spraying water up into the ducts 11b. It has been found advantageous to attach a thin wand to the hose supplying the water. This wand is capable of fitting into the ducts 11b, to provide for a more thorough cleaning. Care should be taken not to use high water pressure at the end spacer plates 14. High water pressure may damage the seal provided by the sealant 15. If the seal is damaged, the inside air may contaminate the outside air flow. This would prevent the heat exchanger 10 from providing dry air to the building. At the same time, the air flow switch may also be cleaned.

When necessary, the first set of channels 11a may be cleaned by removing the end piece 30 and end section 29. This would expose the second end 11d of the first set of channels 11a. Similarly, the end piece 34 and end section 33 may be removed to expose the first end 11c of the first set of channels 11a. Of course, care should be taken to disconnect any wiring leading to the fans 27 and 36.

The heat exchanger 10 provides for warming of the intake air traveling along the first set of channels 11a by the heat transfer from the exhaust air traveling along the second set of channels 11b. This provides for clean, dry and preheated air for entering the animal confinement building. Depending on the relative humidity of the air being exhausted and the amount of dirt in the heat exchanger 10, ice will start forming on the plates from 20 degrees fahrenheit to 0 degrees fahrenheit. The main function of the pressure differential switch 42 is to defrost the ducts 11 when excessive ice forms on the ducts 11. As ice builds up on the ducts 11 and begins to restrict air flow, a vacuum is built up between the first end 11c of the ducts and the exhaust air fan 36. When this pressure differential reaches a set value, such as 0.84 inches water column, the actuator 42d of the pressure differential switch 42 will move from its normal closed position, as shown in FIG. 5 to a second position, wherein the actuator 42d will contact the terminal 42c. This will cause the inside fan motor 36 to shut down. With only the exhaust air fan 36 running, the warm air will melt the ice and decrease the pressure differential. When the pressure differential has dropped to a predetermined value, such as 0.79 inches water column, the pressure differential switch will then move to its first position as shown in FIG. 5, and the outside fan motor 27 will again be activated. When the pressure differential switch 42 is in its second position, the light 54 is energized. This indicates that the defrosting cycle is occuring. It is possible that the pressure differential may be caused by dirt build-up. Therefore, if the light 54 does not go out in a few minutes, it indicates that the second set of channels 11b needs to be cleaned.

The pressure differential switch 42 provides for deicing only when needed. Therefore, the deicing cycle, during which time only warm air is being exhausted and therefore using energy, is activated only when necessary.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

We claim:

1. A counter flow exchanger for transferring heat between intake air and exhaust air, comprising:
   (a) a plurality of ducts having open first and second ends, said ducts connected in a vertical spaced relationship to one another defining therewith two sets of channels, a first set of channels being inside said ducts and a second set of channels being between said ducts, intake air passing through said first set of channels and exhaust air passing through said second set of channels;

(b) means for confining air flow in said second set of channels, said confinement means having a releasably attached bottom, said bottom forming a portion of the confinement means and said bottom is adjacent substantially all of said second set of channels, whereby when said bottom is released, there is ready access to clean substantially all of said second set of channels between said ducts;

(c) means for allowing the intake air and exhaust air to enter and exit from their respective sets of channels without mixing, said means providing an inlet and outlet for fresh air in said first set of channels and an inlet and outle for exhaust air in said second set of channels;

(d) first means for moving the exhaust air through said second set of channels;

(e) second means for moving the intake air through said first set of channels;

(f) a pressure differential switch for sensing the difference between room air pressure and air pressure proximate said second set of channels adjacent said outlet for the exhaust air;

(g) means for controlling said second moving means, said control means activated by said pressure differential switch, whereby when the pressure difference reaches a predetermined value, said controll means shuts off said second moving mean.

2. The heat exchanger of claim 1, wherein said first moving means is a fan positioned proximate said first end of said ducts, whereby the exhaust air is pulled through said second sets of channels.

3. The heat exchanger of claim 1, wherein said second moving means is a fan positioned proximate said second end of said ducts, whereby the fresh air is pulled through said first sets of channels.

4. The heat exchanger of claim 1, further comprising a drip pan releasably attached to said bottom of said confinement means and said bottom of said confinement means having an opening whereby condensate, that may collect on said bottom, passes through said opening into said drip pan.

5. An intake air to exhaust air heat exchanger for use in an animal confinement building comprising:

(a) a plurality of ducts having open first and second ends, said ducts connected in vertical spaced relationship to one another defining therewith two sets of channels, a first set of channels being inside said ducts and a second set of channels being between said ducts, intake air passing through said first set of channels and exhaust air passing through said second set of channels;

(b) a first element head assembly cooperatively connected to said first end of said ducts;

(c) a second element head assembly cooperatively connected to said second end of said ducts, whereby intake air enters said first element head assembly, passes through said first set of channels and exits through said second element head asesmbly;

(d) an enclosure having first and second ends surrounding said ducts and said first and second element head assemblies, whereby exhaust air enters said enclosure at said second end, moves around said second element head assembly and enters said second set of channels and exits around said first element head assembly and exits said first end of said enclosure;

(e) said enclosure having a releasably attached bottom, whereby when said bottom is released, there is ready access to clean between said ducts;

(f) first means for moving the exhaust air through said second set of channels;

(g) second means for moving the intake air through said first set of channels;

(h) a pressure differential switch for sensing the difference between room air pressure and air pressure in said second set of channels adjacent said outlet for the exhaust air; and (i) means for controlling said second moving means, said control means activated by said pressure differential switch, whereby when the pressure difference reaches a predetermined value, said control means shuts off said second moving means.

6. The heat exchanger of claim 5 further comprising means for providing a turbulent air stream as the exhaust air enters said second set of channels.

7. The heat exchanger of claim 5 wherein said first moving means is a fan positioned proximate said first end of said ducts, whereby the exhaust air is pulled through said second sets of channels.

8. The heat exchanger of claim 5, wherein said second moving means is a fan positioned proximate said second end of said ducts, whereby the fresh air is pulled through said first sets of channels.

9. The heat exchanger of claim 5, further comprising a drip pan releasably attached to said bottom of said confinement means and said bottom of said confinement means having openings whereby condensate, that may collect on said bottom, passes through said opening into said drip pan.

10. The heat exchanger of claim 9, wherein said bottom of said confinement means is pivotably attached to said confinement means, whereby said bottom of said confinement means is both releasably and pivotally attached to said confinement means wherein said bottom may be released to allow access to clean said second set of channels and still be pivotally attached to said confinement means.

* * * * *

UNITED STATES PATENT AND TRADEMARK OFFICE
CERTIFICATE OF CORRECTION

PATENT NO. : 4,653,574
DATED : March 31, 1987
INVENTOR(S) : Warren W. Quinlisk, James A. Fernholz It is certified that error appears in the above-identified patent and that said Letters Patent are hereby corrected as shown below:

In column 3, line 24, please delete "te" and substitute therefore --the--.

In column 5, line 5, please delete "connected" and substitute therefore --connecting-- and please delete "26" and substitute therefore --36--.

In column 6, line 2, please delete "43a" and substitute therefore --34a--.

In column 7, line 56, please delete "10" and substitute therefore --10--.

In column 9, line 16, please delete "outle" and substitute therefore --outlet--.

In column 9, line 29, please delete "controll" and substitute therefore --control--.

In column 10, lines 5 and 6, please delete "asesmbly" and substitute therefore --assembly--.

Signed and Sealed this

Twenty-second Day of March, 1988

Attest:

DONALD J. QUIGG

Attesting Officer

Commissioner of Patents and Trademarks